(12) United States Patent
Gorokhov et al.

(10) Patent No.: US 7,633,923 B2
(45) Date of Patent: Dec. 15, 2009

(54) TRANSMISSION SYSTEM FOR TRANSMITTING AN INFORMATION SIGNAL VIA A PLURALITY OF SUBCHANNELS FROM A TRANSMITTER TO A RECEIVER

(75) Inventors: Alexei Gorokhov, Eindhoven (NL); Franciscus Maria Joannes Willems, Geldrop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 624 days.

(21) Appl. No.: 10/529,359

(22) PCT Filed: Aug. 8, 2003

(86) PCT No.: PCT/IB03/03567

§ 371 (c)(1),
(2), (4) Date: Mar. 25, 2005

(87) PCT Pub. No.: WO2004/030264

PCT Pub. Date: Apr. 8, 2004

(65) Prior Publication Data

US 2006/0045062 A1    Mar. 2, 2006

(30) Foreign Application Priority Data

Sep. 30, 2002    (EP) ................... 02079073

(51) Int. Cl.
*H04J 1/00*    (2006.01)
(52) U.S. Cl. .................................. 370/343
(58) Field of Classification Search ............... 370/221, 370/216, 254, 343; 375/261, 259
See application file for complete search history.

(56) References Cited

U.S. PATENT DOCUMENTS 6,442,152 B1 * 8/2002 Park et al. ................. 370/341
7,292,647 B1 * 11/2007 Giannakis et al. ........... 375/295

\* cited by examiner

*Primary Examiner*—Lester Kincaid
*Assistant Examiner*—Steven Lim

(57) ABSTRACT

Described is a transmission system (10) for transmitting an information signal (21) via a plurality of subchannels from a transmitter (12) to a receiver (16). The transmitter (12) first demultiplexes the information signal (21) into a plurality of information subsignals (33). Next, the information subsignals (33) are encoded according to a code with certain properties, e.g. a maximum distance separable (MDS) code, and multiplexed. Finally, the resulting subsignals (31) are channel encoded and transmitted to the receiver (16). The receiver (16) comprises a channel decoder (46,52,76,128) for successively channel decoding the received subsignals by incorporating decoding information (83,87,91) of already channel decoded information subsignals. Next, the resulting subsignals are demultiplexed, decoded according to said code and multiplexed into an output signal. Said code enables input symbols to be encoded into output symbols such that k input symbols of the k-th information subsignal are encoded with a k×m-code into m output symbols, $1 \leq k \leq m$, said code having the following properties: all k input symbols and all m−k other output symbols are determinable from any k output symbols, and no m−l other output symbols are determinable from any l output symbols l.

10 Claims, 17 Drawing Sheets

Figure 1:
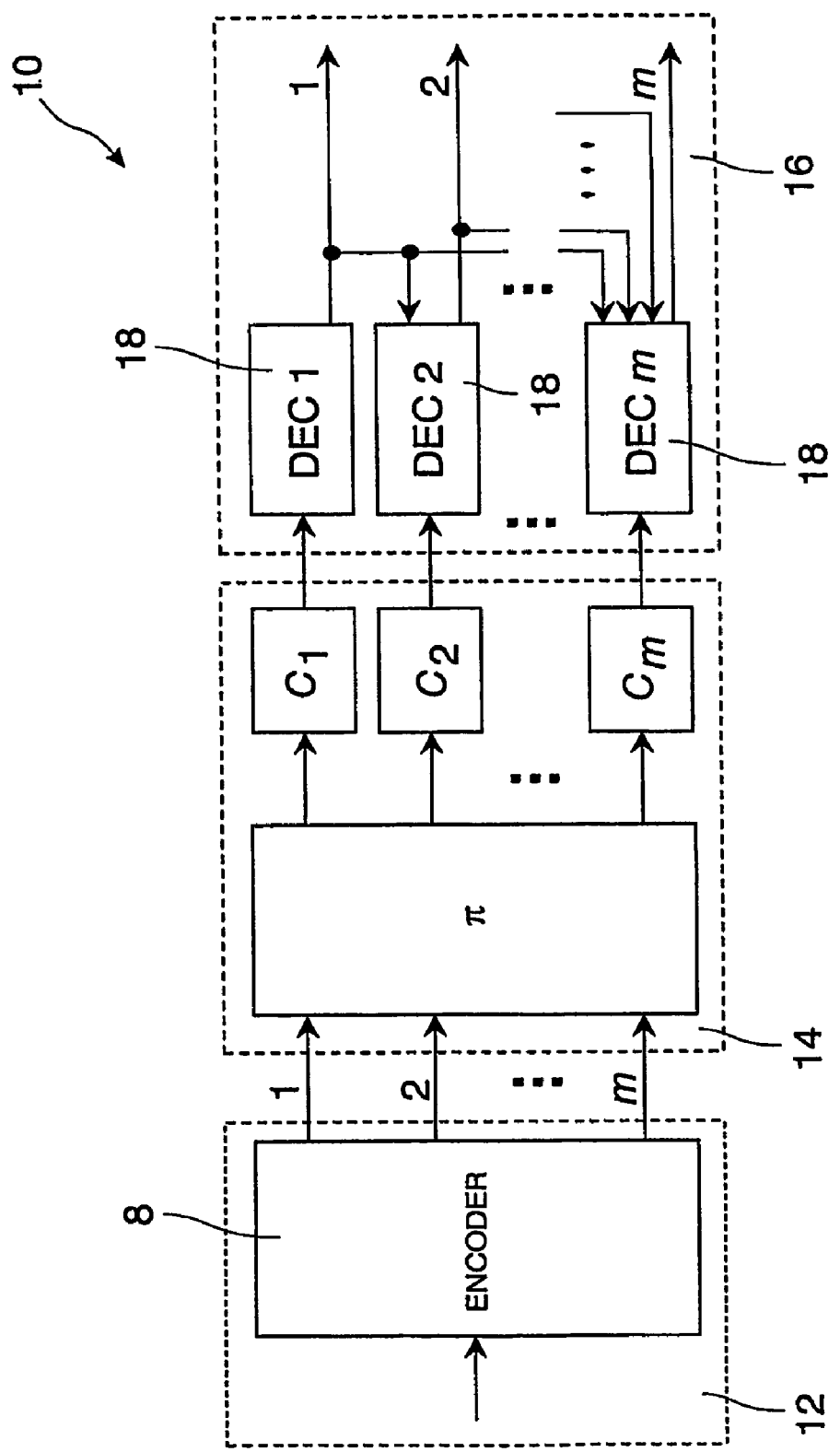

| π[1] | π[2] | $c_\pi[1]$ | $c_\pi[2]$ | $b_1$ | $b_2$ | $c_\pi[3]$ |
|---|---|---|---|---|---|---|
| 1 | 2 | 0 | 0 | 0 | 0 | 0 |
| 1 | 2 | 0 | 1 | 0 | 1 | 1 |
| 1 | 2 | 1 | 0 | 1 | 0 | 1 |
| 1 | 2 | 1 | 1 | 1 | 1 | 0 |
| 1 | 3 | 0 | 0 | 0 | 0 | 0 |
| 1 | 3 | 0 | 1 | 0 | 1 | 1 |
| 1 | 3 | 1 | 0 | 1 | 1 | 1 |
| 1 | 3 | 1 | 1 | 1 | 0 | 0 |
| 2 | 3 | 0 | 0 | 0 | 0 | 0 |
| 2 | 3 | 0 | 1 | 1 | 0 | 1 |
| 2 | 3 | 1 | 0 | 1 | 1 | 1 |
| 2 | 3 | 1 | 1 | 0 | 1 | 0 |

FIG.15

| π[1] | π[2] | $c_\pi[1]$ | $c_\pi[2]$ | $b_1$ | $b_2$ | $c_\pi[3]$ |
|---|---|---|---|---|---|---|
| 2 | 1 | 0 | 0 | 0 | 0 | 0 |
| 2 | 1 | 0 | 1 | 1 | 0 | 1 |
| 2 | 1 | 1 | 0 | 0 | 1 | 1 |
| 2 | 1 | 1 | 1 | 1 | 1 | 0 |
| 3 | 1 | 0 | 0 | 0 | 0 | 0 |
| 3 | 1 | 0 | 1 | 1 | 1 | 1 |
| 3 | 1 | 1 | 0 | 0 | 1 | 1 |
| 3 | 1 | 1 | 1 | 1 | 0 | 0 |
| 3 | 2 | 0 | 0 | 0 | 0 | 0 |
| 3 | 2 | 0 | 1 | 1 | 1 | 1 |
| 3 | 2 | 1 | 0 | 1 | 0 | 1 |
| 3 | 2 | 1 | 1 | 0 | 1 | 0 |

FIG.16

| $\{\pi[1],\pi[2]\}$ | $I_1$ | $I_2$ | $O_{\pi[3]}$ |
|---|---|---|---|
| $\{1,2\}$ | $O_1$ | $O_2$ | $ln\left[\frac{p_1p_2+(1-p_1)(1-p_2)}{p_1(1-p_2)+(1-p_1)p_2}\right]$<br>$p_1=(1+e^{-O_1})^{-1}$<br>$p_2=(1+e^{-O_2})^{-1}$ |
| $\{1,3\}$ | $O_1$ | $ln\left[\frac{p_1p_3+(1-p_1)(1-p_3)}{p_1(1-p_3)+(1-p_1)p_3}\right]$<br>$p_1=(1+e^{-O_1})^{-1}$<br>$p_3=(1+e^{-O_3})^{-1}$ | $I_2$ |
| $\{2,3\}$ | $ln\left[\frac{p_2p_3+(1-p_2)(1-p_3)}{p_2(1-p_3)+(1-p_2)p_3}\right]$<br>$p_2=(1+e^{-O_2})^{-1}$<br>$p_3=(1+e^{-O_3})^{-1}$ | $O_2$ | $I_1$ |

FIG.17

| {π[1],π[2]} | $I_1$ | $I_2$ | $O_{\pi[3]}$ |
|---|---|---|---|
| {1,2} | $O_1$ | $O_2$ | $(-1)^{(\text{sgn}(O_1)+\text{sgn}(O_2))} \min(|O_1|,|O_2|)$ |
| {1,3} | $O_1$ | $(-1)^{(\text{sgn}(O_1)+\text{sgn}(O_3))} \cdot \min(|O_1|,|O_3|)$ | $I_2$ |
| {2,3} | $(-1)^{(\text{sgn}(O_2)+\text{sgn}(O_3))} \cdot \min(|O_2|,|O_3|)$ | $O_2$ | $I_1$ |

$\text{Sgn}(x) \triangleq \{0 : x \geq 0; 1 : x < 0\}$

FIG. 18

_US 7,633,923 B2_

TRANSMISSION SYSTEM FOR TRANSMITTING AN INFORMATION SIGNAL VIA A PLURALITY OF SUBCHANNELS FROM A TRANSMITTER TO A RECEIVER

The invention relates to a transmission system for transmitting an information signal via a plurality of subchannels from a transmitter to a receiver.

The invention further relates to a transmitter for transmitting an information signal via a plurality of subchannels to a receiver, to a receiver for receiving encoded information subsignals via a plurality of subchannels from a transmitter, to a method of transmitting an information signal via a plurality of subchannels to a receiver and to a method of receiving encoded information subsignals via a plurality of subchannels from a transmitter.

Such a transmission system is known from European Patent Application EP 0 951 091 A2. In this known transmission system multiple transmit antennas are used to transmit streams of coded symbols (i.e. the encoded information subsignals) that originate from the same data source (i.e. the information signal). At the receiver, these multiple streams are received by means of multiple receive antennas and decoded successively by removing the data streams that have been decoded at earlier stages and by canceling the remaining data streams, due to the multiple receive antennas, via spatial (space-time or space-frequency) interference cancellation. Such a scheme is often referred to as an ordered successive interference cancellation (OSIC) scheme.

The capacity (throughput) of the known transmission system is limited.

It is an object of the invention to provide a transmission system according to the preamble having a higher transmission capacity than the known transmission system. This object is achieved in the transmission system according to the invention, said transmission system being characterized in that the transmitter comprises:

- a demultiplexer for demultiplexing the information signal into a plurality of information subsignals in dependence on a throughput of the subchannels as ordered by the receiver;
- an encoder for encoding input symbols of the information subsignals into output symbols such that k input symbols of the k-th information subsignal are encoded with a k×m-code into m output symbols, $1 \leq k \leq m$, said code having the following properties:
- all k input symbols and all m−k other output symbols are determinable from any k output symbols, and no m−l other output symbols are determinable from any l output symbols, $l<k$;
- a multiplexer for multiplexing the output symbols into output information subsignals;
- a channel encoder for channel encoding the output information subsignals into encoded information subsignals;
- and means for transmitting each encoded information subsignal via one of the subchannels to the receiver;

the receiver comprising:

means for receiving the encoded information subsignals;

- a channel decoder for successively channel decoding the received encoded information subsignals into channel decoded information subsignals by incorporating decoding information of already channel decoded information subsignals;
- a demultiplexer for demultiplexing the channel decoded information subsignals into channel decoded symbols;
- a decoder for decoding the channel decoded symbols into decoded output symbols and for supplying the decoding information regarding the decoded output symbols to the channel decoder;
- a further multiplexer for multiplexing the decoded output symbols into an output information signal. As will be shown later, by using such a code the transmission system can achieve a maximum throughput.

In an embodiment of the transmission system according to the invention the code is a maximum distance separable (MDS) code. MDS codes are widely known and posess the desired properties that enable the encoding principle according to the invention.

In another embodiment of the transmission system according to the invention the transmitter further comprises an interleaver coupled between the multiplexer and the channel encoder, the interleaver being arranged for interleaving the output information subsignals, wherein the channel encoder is arranged for encoding the interleaved output information subsignals into the encoded information subsignals. This interleaver is meant to homogeneously spread the information elements within the stream of the output information elements, so as to efficiently use the information elements known from the previously decoded streams for the decoding of the current stream.

In a further embodiment of the transmission system according to the invention the channel decoder is arranged for decoding a received encoded information subsignal by incorporating decoding information of the most recently channel decoded information subsignal. In such a case, the most recent update on an information element of an information subsignal may incorporate all the available estimates (reliability measures) on the information elements shared through the previously decoded substreams, thereby providing the highest reliabilities of these information elements.

Figure 2:
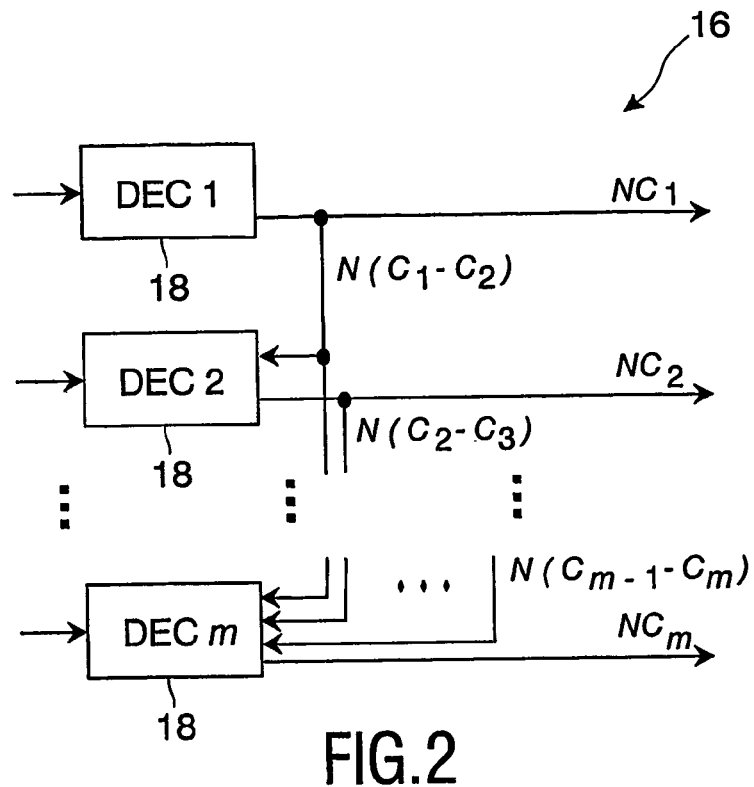
Figure 5:
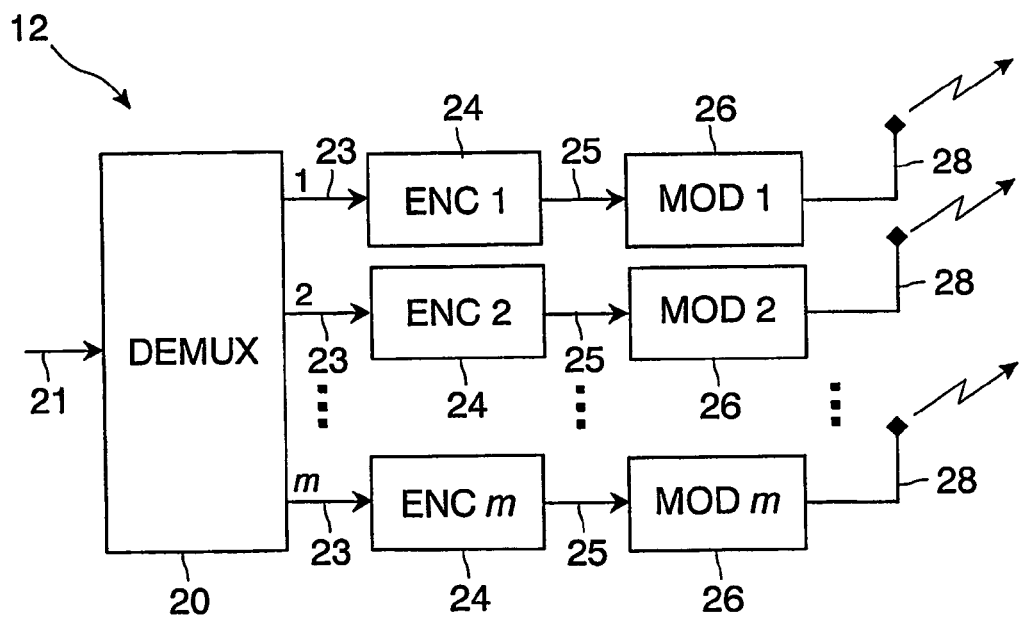
Figure 3:
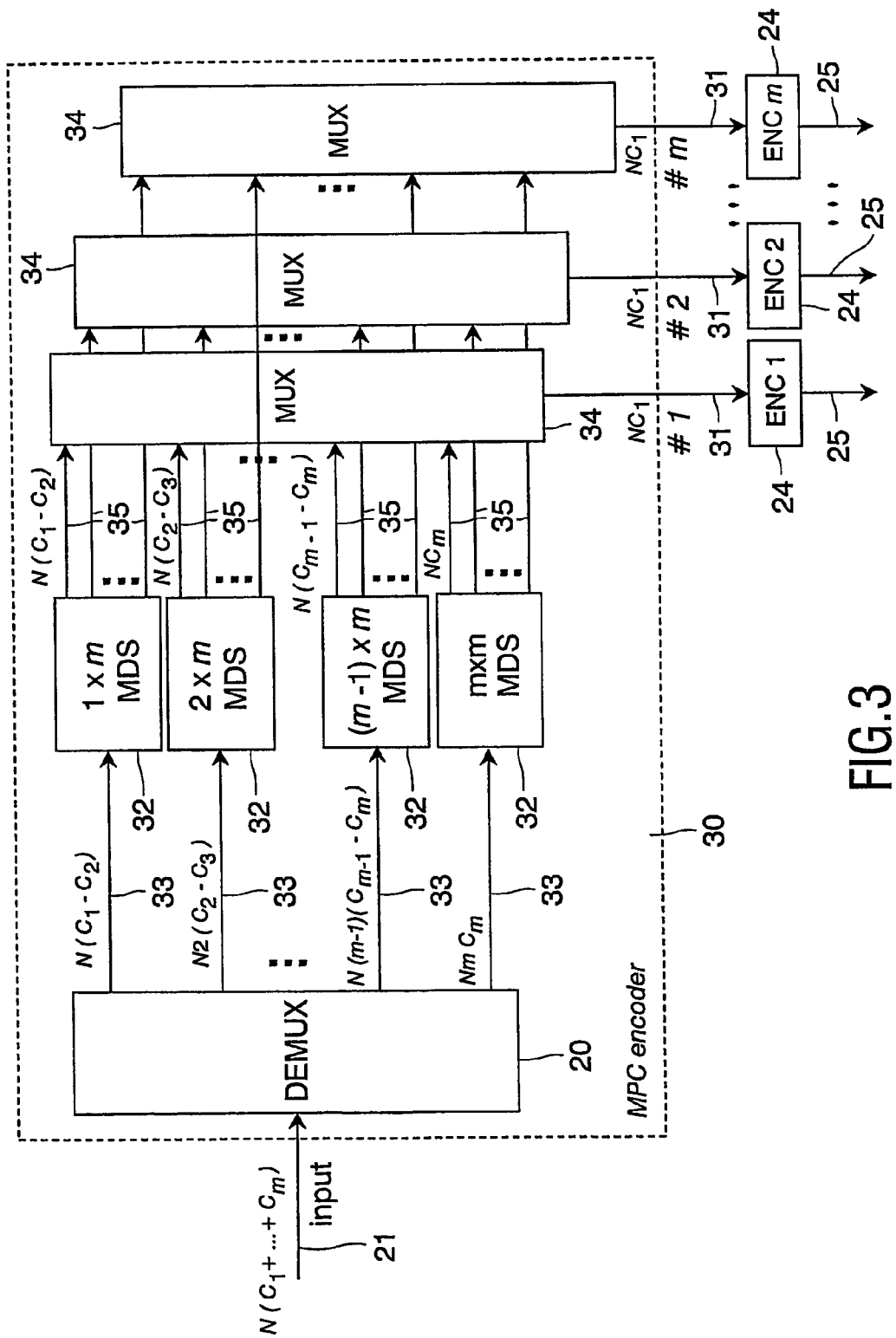
Figure 4:
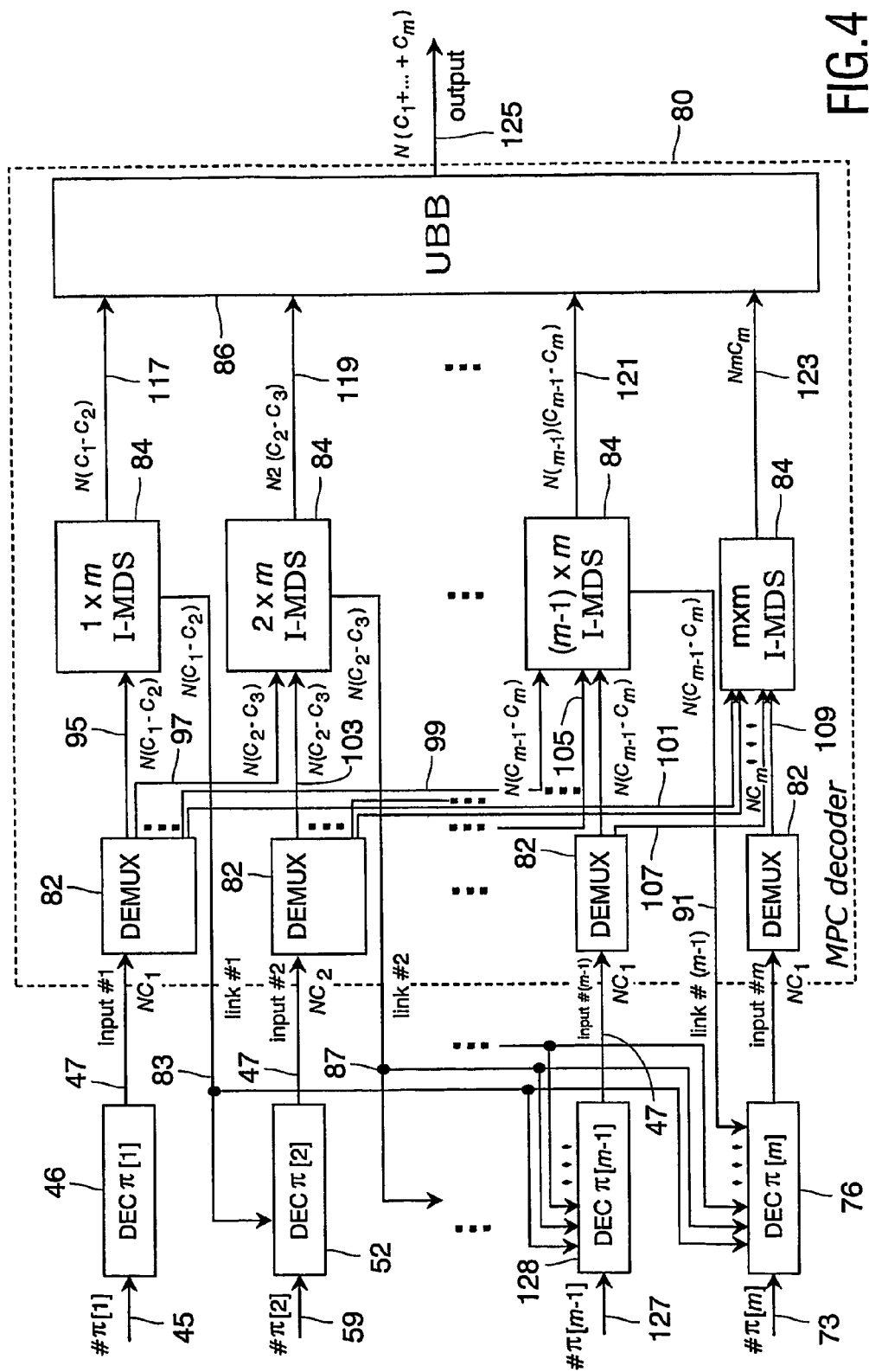
Figure 6:
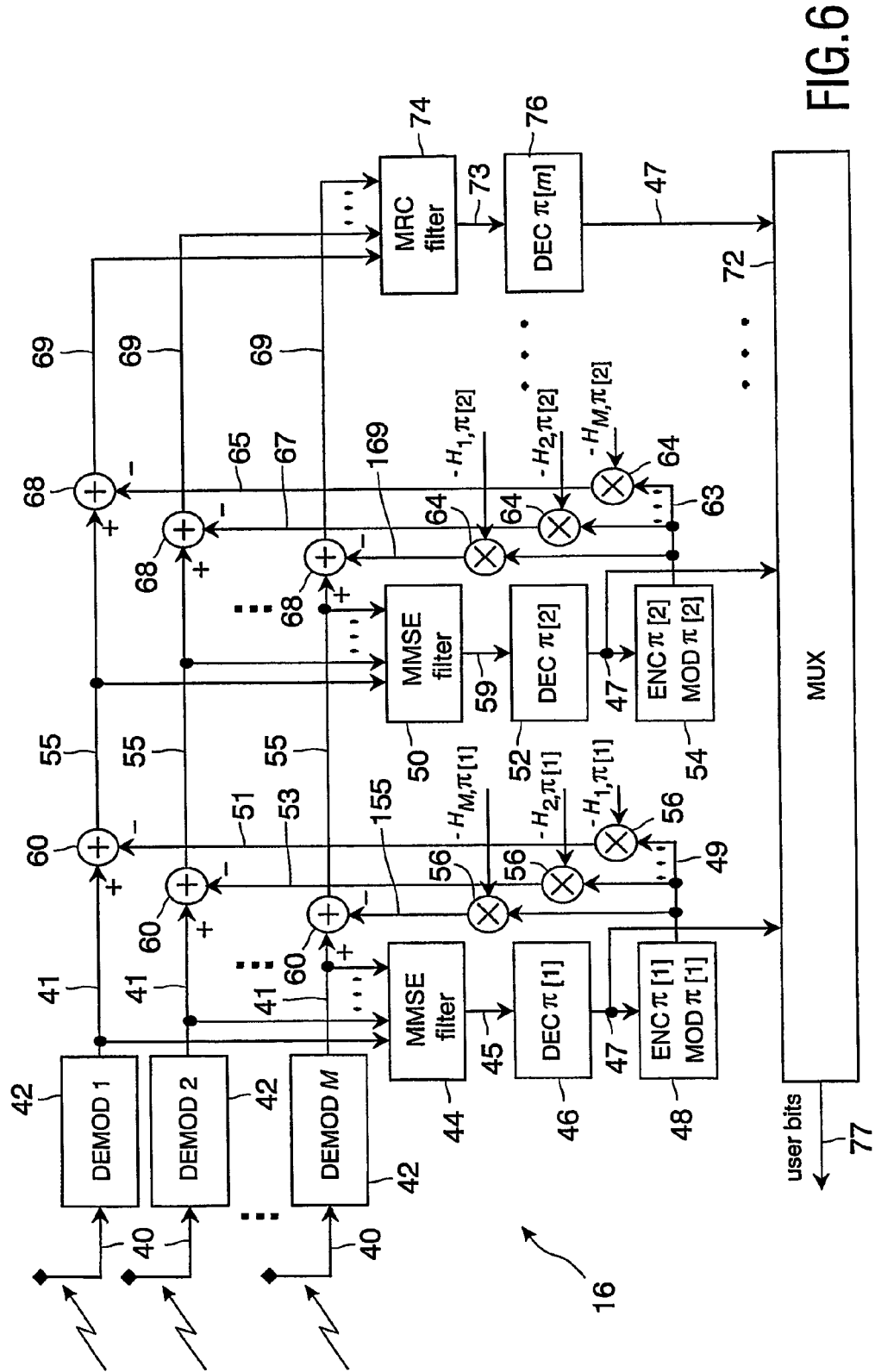
Figure 7:
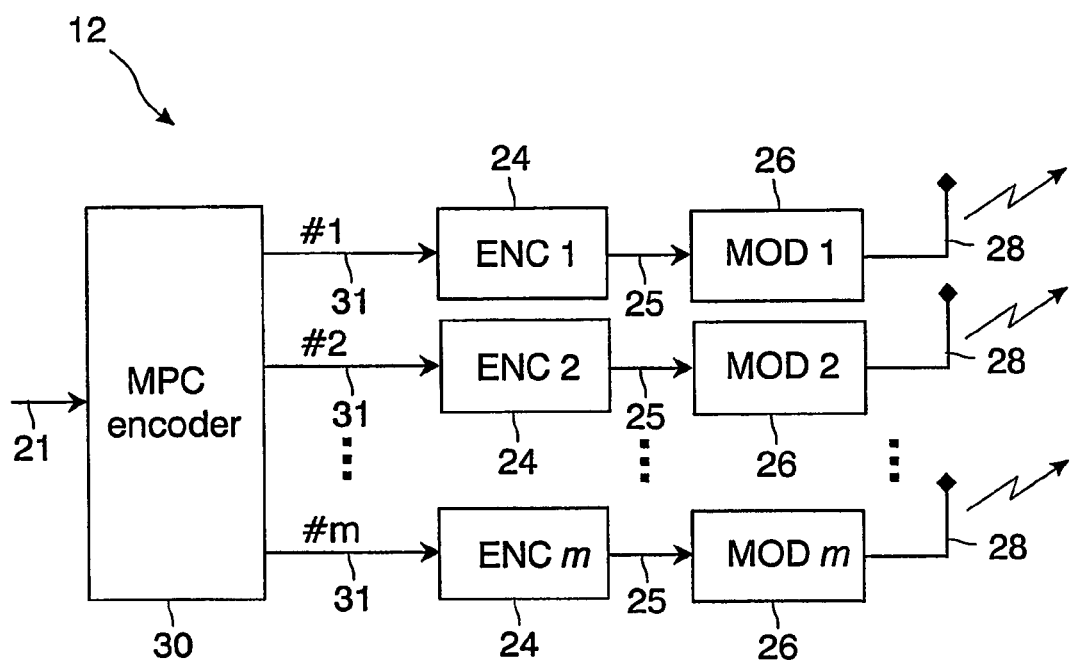
Figure 8:
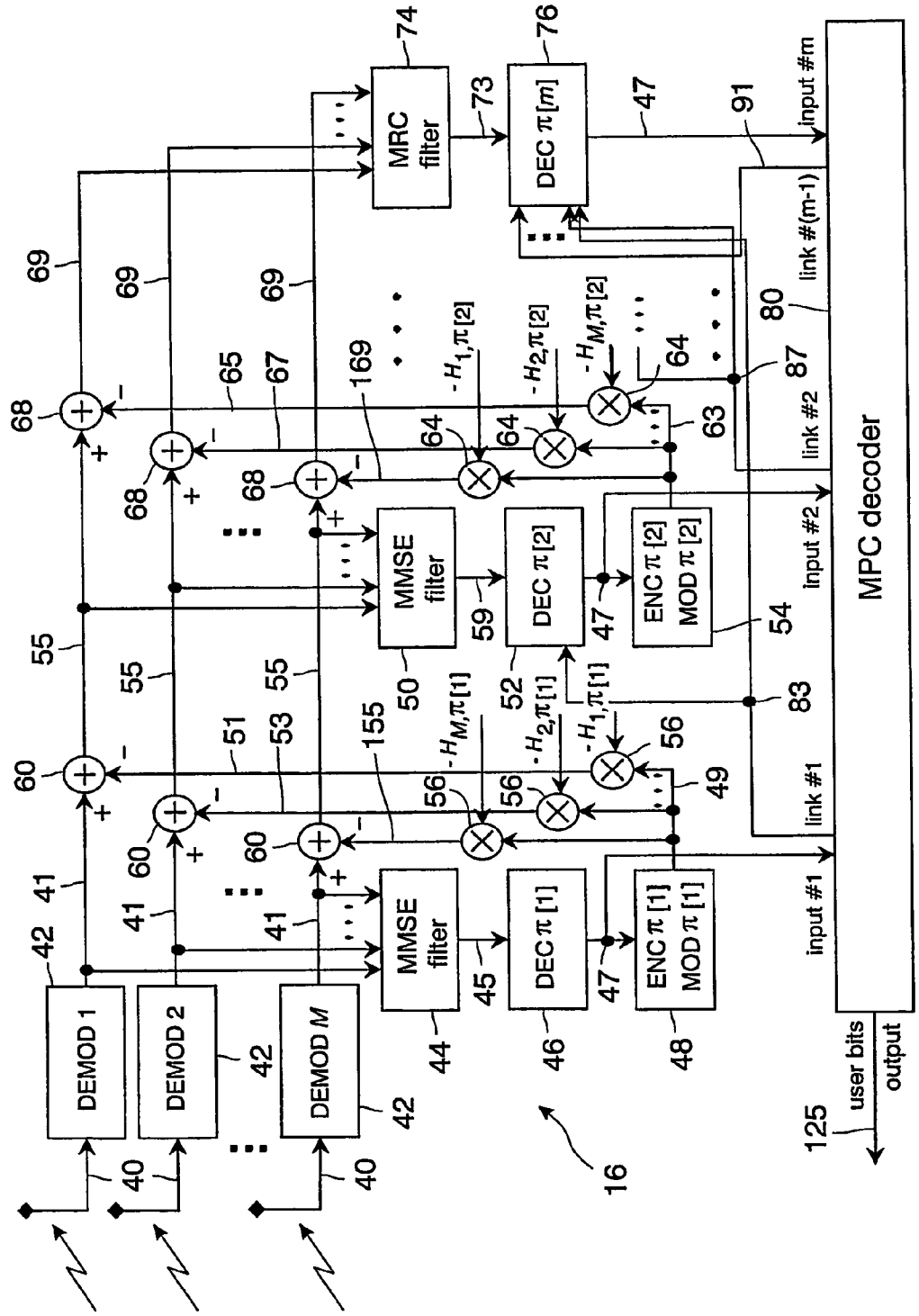
Figure 9:
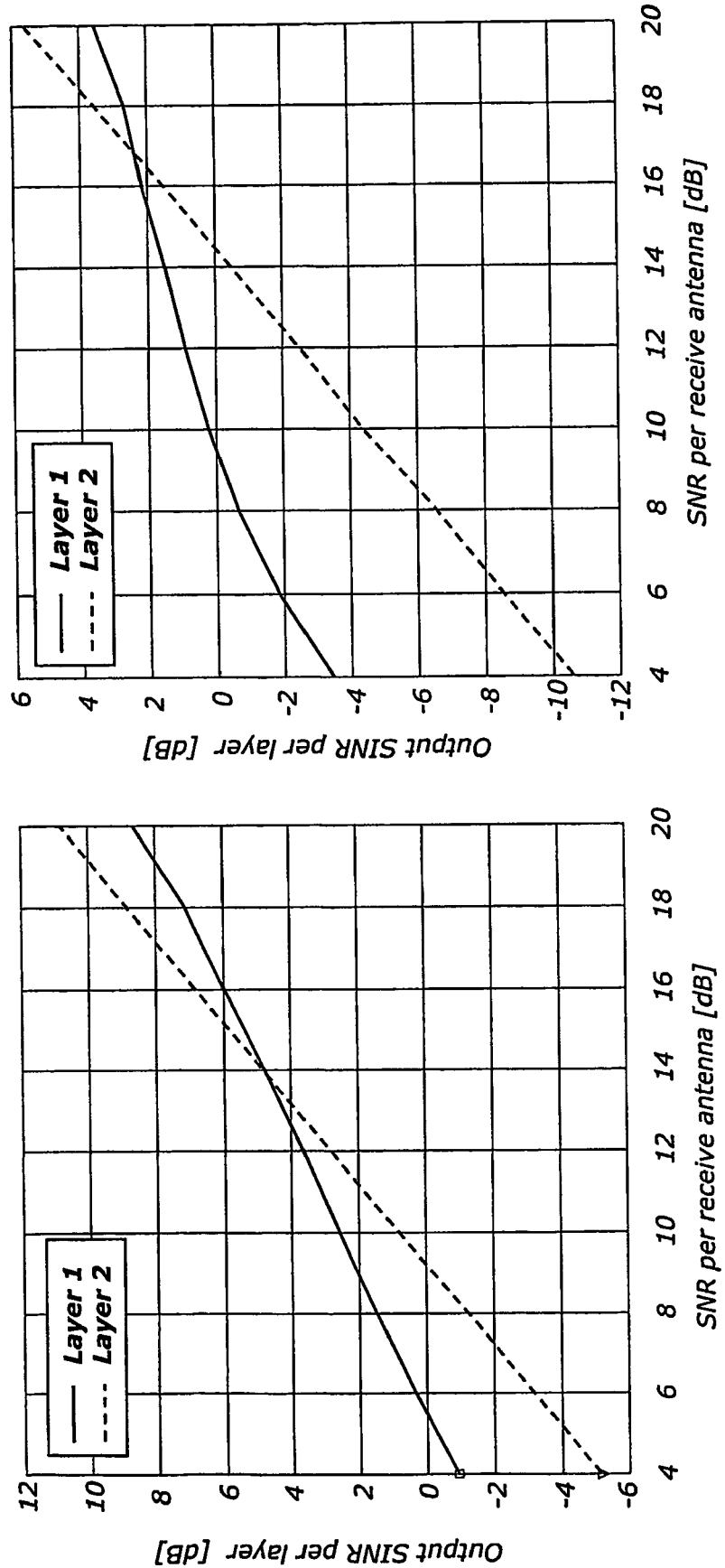

The above object and features of the present invention will be more apparent from the following description of the preferred embodiments with reference to the drawings, wherein:

FIG. 1 shows a block diagram of a transmission system 10 according to the invention, FIG. 2 shows a block diagram of a receiver 16 according to the invention, FIG. 3 shows a block diagram of an encoder structure including an MPC encoder 30 for use in a transmitter 12 according to the invention, FIG. 4 shows a block diagram of a decoder structure including an MPC decoder 80 for use in a receiver 16 according to the invention, FIG. 5 shows a block diagram of a prior art transmitter 12, FIG. 6 shows a block diagram of a prior art wireless receiver 16, FIG. 7 shows a block diagram of an embodiment of a transmitter 12 according to the invention, FIG. 8 shows a block diagram of an embodiment of a receiver 16 according to the invention, FIGS. 9 to 14 show some graphs illustrating the performance of a transmission system 10 according to the invention, FIGS. 15 and 16 show a lookup table for use in hard decision decoding of the (3, 2, 1) MDS code, FIG. 17 shows computation rules for use in MAP decoding of the (3, 2, 1) MDS code, FIG. 18 shows computation rules for use in soft ML (Max-Log-MAP) decoding of the (3, 2, 1) MDS code.

In the Figures, identical parts are provided with the same reference numbers.

This invention relates to a transmission system 10 as shown in FIG. 1 which transmission system 10 makes use of multiple subchannels to deliver information from a transmitter 12 to a receiver 16. In the receiver 16, the signals from different subchannels are decoded successively by decoders 18. The order of decoding is defined at the receiver 16 and is unknown to the transmitter 12. It is assumed that the transmitter 12 is aware of the ordering principle and of some properties of the ordered sequence of subchannels such as statistics (e.g. Rayleigh fading) of the capacities (maximum throughputs) of the ordered subchannels. Alternatively, the transmitter 12 may be aware of the signal to noise (and interference) ratio (SNR/SINR) of the ordered subchannels. However, the order of decoding for each realization of subchannels is random, as seen by the transmitter 12. The present invention is related to a channel coding strategy that makes use of the known properties of the subchannels to enhance the performance of such a multi-channel transmission system 10. This channel coding strategy comprises an encoder and a decoder architecture. The general coding strategy is further applied to enhance the performance of wireless transmission systems that make use of multiple transmit antennas to transmit multiple parallel data streams and multiple receive antennas with an ordered extraction of the transmitted streams at the receiver known as ordered successive interference cancellation (OSIC).

First, we explain the basic idea of the proposed channel coding strategy which allows to reach the maximum achievable throughput (Shannon capacity) of multiple channels with ordered successive decoding. To this end, the equivalent scheme of such a channel will be defined and a fundamental limitation on the throughput of such a scheme will be shown. Next, a forward error correction (FEC) structure that approaches the fundamental throughput bound will be described.

The general case of a system with an arbitrary number m of subchannels, ordered successive decoding of the corresponding data streams at the receiver 16, with a known sequence of ordered capacities, is illustrated by the block diagram in FIG. 1. According to this diagram, in the transmitter 12 a set of user bits is encoded by an encoder 8 into m parallel streams that are transmitted over an m input m output channel 14. This channel 14 is represented by a permutation $\pi$ of the m transmitted streams followed by m parallel subchannels with the respective capacities (or throughputs) $C_1 \ldots C_m$. Precisely, $\pi[n]$ specifies the index of the transmitted stream that is permuted to the n-th subchannel. The set of capacities is known at the receiver 16 and to the transmitter 12 whereas the permutation $\pi$ is known at the receiver 16 only. The transmitter 12 treats $\pi$ as a random permutation (specifically, $\pi$ is assumed uniformly distributed over the set of m possible permutations). At the receiver 16, the m streams are decoded successively so that n-th decoder 18 makes use of the knowledge of the user (input) bits recovered by the previous (n−1) decoders 18, $1 < n \leq m$.

The overall throughput (channel capacity) of such system is limited by the sum of throughputs of individual subchannels, i.e.

$$C_\Sigma \leq C_1 + \ldots + C_m. \quad (1)$$

This capacity may be only reached when the rate at the n-th output of the permutation $\pi$ is matched to the respective capacity $C_n$, $1 \leq n \leq m$. This latter condition along with the fact that $\pi$ is unknown at the transmitter 12 has a number of implications for an optimal encoding rule. First of all, each transmitted data stream should carry data at rate $R_1 = C_1$. If the rate of the k-th stream differs from $C_1$, it will not fit the respective throughput/capacity in the event that $\pi[1] = k$. Hence, for a block of N channel uses (complex signal dimensions), the total number of bits within each stream should be $NC_1$. In the same manner, one can see that the conditional rate of any stream upon decoding of any other stream should be $R_{2|1} = C_2$. Indeed, the stream decoded at the second stage will benefit from a partial knowledge of the bits that is provided by the first stream. In order to match the throughput of the second subchannel, this partial knowledge should lead to a rate reduction from $C_1$ to $C_2$. Consequently, the remaining number of unknown bits in any stream upon decoding of any other stream should equal $NC_2$. This implies that the decoder of the first (uppermost) subchannel should carry over the knowledge of $N(C_1-C_2)$ bits to the second subchannel. By iterating the same argument, it is easy to show that the decoder of the n-th subchannel should carry $N(C_n-C_{n+1})$ additional bits over to the decoders of the following subchannels. In this case, the remaining number of unknown bits at the (n+1)-th subchannel equals to the difference between the total of $N C_1$ bits carried by a stream at the (n+1)-th subchannel and the total number of bits carried over by the previous decoding stages:

$$N C_1 - N(C_1 - C_2) - \ldots - N(C_n - C_{n+1}) = N C_{n+1} \quad (2)$$

This number matches the throughput $N C_{n+1}$ of the (n+1)-th subchannel.

The described flow of decoding stages is represented schematically in FIG. 2. This block diagram shows the number of newly decoded user bits at each decoding stage 18 as well as the number of bits carried over to the following stages 18. Clearly, all the bits that are carried over to the decoder 18 of any subchannel from the previous decoding stages 18 should be shared/included with the bits encoded in the data stream which is fed to this subchannel. Furthermore, the relationship between the streams should be fully symmetric w.r.t. any reordering of the streams, since $\pi$ is unknown at the transmitter 12.

One can notice that the block diagram in FIG. 2 implies a non-negative difference between the throughputs of the adjacent stages and therefore $$C_1 \geq C_2 \geq \ldots \geq C_m. \quad (3)$$

This condition is fundamental to reach the equality in (1) for the general system in FIG. 1. In this system, the data rate at the n-th subchannel is a conditional rate $R_{n|1 \ldots n-1}$ of any transmitted stream given the knowledge of any other (n−1) streams decoded at the preceding stages. On one hand, a sequence of conditional rates is non-increasing. On the other hand, the maximum throughput is only achieved when these rates are matched to the throughputs of the respective subchannels, i.e. $R_{n|1 \ldots n-1} = C_n$, $1 \leq n \leq m$. Hence the condition (3) is mandatory to achieve the maximum throughput. Whenever this condition does not hold, the maximum throughput of the system in FIG. 1 will be limited by $$C_\Sigma = \underline{C}_1 + \ldots + \underline{C}_m, \text{ wherein } \underline{C}_n = \min\{C_1, \ldots, C_n\},$$
$$1 \leq n \leq m \quad (4)$$

Note that the sequence $\{\underline{C}_1, \ldots, \underline{C}_m\}$ maximizes $C_\Sigma$ from (4) under the constraint (3).

Next, we describe a new encoding scheme that allows for the total throughput specified in (4). This scheme involves a class of codes widely known as maximum distance separable (MDS) codes. An MDS code can be specified by a triple (n, k, $2^q$) wherein k is the number of input (information) symbols, n is the number of output (coded) symbols and q specifies the alphabet GF($2^q$). This means that input and output symbols belong to the alphabet A={0, 1, ..., $2^q-1$}. An MDS code is a linear code, hence it may be described by a k×n generator matrix G with entries from A. A vector of k input symbols $a = [a_1, \ldots, a_n]$ from the alphabet A is encoded into n output symbols $c = [c_1, \ldots, c_n]$ from the same alphabet via $$c = a\,G \tag{5}$$

wherein multiplications/additions take place in $GF(2^q)$, i.e. the result of standard operations (multiplications & additions) is taken modulo $2^q$. The definition given above includes the whole class of linear block codes. The subclass of MDS codes is characterized by such generator matrices G that any arbitrary subset of k symbols from the set of n output symbols of c yields the set of input symbols a and therefore the remaining (n−k) output symbols. An important consequence of the above definition of MDS codes is that knowledge of any set of less than k output symbols of c gives no information about the remaining output symbols.

The last two properties of the MDS codes are essential to design the encoding scheme that matches the decoding flow indicated in FIG. 2 and therefore allows to achieve the maximum total throughput given by (4). The construction of such codes is based on MDS codes and will be explained in the following section. Nevertheless, any other code having the same two essential properties as the known MDS codes may equally well be used in the present invention.

Some more facts about MDS codes w.r.t code construction: First of all, we note that a linear code is MDS if and only if its k×n generator matrix G is such that all k×k blocks of G are full rank. Such a matrix may be built if $n \leq 2^q + 1$. It is worth mentioning that binary MDS codes (i.e. codes operating with bits, q=1) exist for $n \leq 3$ only. For n>3, one has to make use of q>1. However, a (n, k, q) MDS with q>1 may be adapted to encode a stream of bits. A possible solution consists of the following steps:

group the stream of input bits into a stream of q-tuples of bits;
  map of these q-tuples to the symbols from alphabet A;
  encode of the blocks of k symbols according to (5);
  de-mapping of the resulting output symbols from A to q-tuples of bits.

Clearly, the total number of input/output bits of such an encoder should be a multiple of q. Next, we will see that the described four step encoding procedure allows us to match the decoding flow in FIG. 2 and therefore reach maximum throughput with any $q \geq 1$.

Let us show a few simple cases of MDS codes. We make use of these codes in the examples of code construction later in this document.

(2, 1, 1) MDS code: $G = [1\ 1]$, (3, 1, 1) MDS code:
    $G = [1\ 1\ 1]$, $$(3, 2, 1)\ MDS\ code:\ G = \begin{bmatrix} 1 & 0 & 1 \\ 0 & 1 & 1 \end{bmatrix}. \tag{6}$$

We finally note that a systematic design of MDS codes may be achieved. One possibility is to use extended Reed-Solomon codes.

Next, we describe the operation of the forward error correction (FEC) structure that enables the full throughput (4). The core engine of this structure is a so-called message-partition code (MPC), based on cascaded MDS codes. Block-diagrams of the entire encoder and decoder are given in FIG. 3 and FIG. 4 respectively. For sake of simplicity, assume that (3) is satisfied (otherwise $\{C_1, \ldots, C_m\}$ should be replaced by $\{\underline{C}_1, \ldots, \underline{C}_m\}$). An information signal 21 comprising a set of $N(C_1 + \ldots + C_m)$ user bits 21, corresponding to the maximum throughput of $(C_1 + \ldots + C_m)$, is fed to the input of the encoder 30. This set is further partitioned/demultiplexed by a demultiplexer 20 into m subsets 33 (or information subsignals 33) with sizes $N(C_1-C_2), N2(C_2-C_3), \ldots N(m-1)(C_{m-1}-C_m)$ and $NmC_m$. The first subset 33 serves as input to an MDS encoder 32 with parameters (m, 1, •). The last parameter (alphabet size) is immaterial for our construction and may be chosen upon the convenience (availability) of an MDS code with appropriate dimensions. Note that each input symbol of a (m, 1, •) MDS code produces m output symbols. The whole block of $N(C_1-C_2)$ bits will result in m parallel streams 35 of $N(C_1-C_2)$ output bits. These streams 35 are fed to m multiplexers 34 in FIG. 3. In the same way, the k-th subset 33 containing $N k(C_k-C_{k+1})$ user bits is fed to an MDS encoder 32 with parameters (m, k, •), $1 \leq k \leq m$. Such a code encodes groups of k user symbols into respective groups of m output symbols. Again, the whole block of $N k(C_k-C_{k+1})$ user bits results in m parallel streams 35 of $N(C_k-C_{k+1})$ output bits. These streams 35 are fed to m multiplexers 34, similarly to the outputs of the first MDS encoder 32. Finally, the very last subset 33 of $NmC_m$ is simply partitioned into m parallel streams 35 of $NC_m$ bits, which streams are fed to m multiplexers 34 as indicated in FIG. 3. The outputs 31 (or output information subsignals 31) of the multiplexers 34 represent the m outputs of the MPC encoder 30. It is easy to see that each output 31 carries $NC_1$ bits. Note that this number matches the required rate of each transmitted data stream.

The output information subsignals 31 should undergo the conventional steps of FEC encoding (represented schematically by the channel encoder blocks 24 in FIG. 3) and modulation prior to the transmission. Here, we assume an ideal encoding at the transmitter 12 such that the codebooks are optimally matched to the statistical properties of the transmission channel and a subsequent optimal processing at the receiver 16. The output information subsignals 31 are encoded by the channel encoders 24 into encoded information subsignals 25.

According to the block-diagram in FIG. 1, the $\pi[1]$-th transmitted stream 45 (i.e. the received encoded information subsignal 45) is the first to be processed at the receiver 16. Since any transmitted stream carries $NC_1$ bits, the corresponding rate matches the throughput $C_1$ of the first subchannel as indicated in FIG. 1. Hence, an optimal channel decoder 46 in FIG. 4 restores $NC_1$ bits 47 (i.e. the channel decoded information subsignal 47) of the first data stream. These bits 47 are fed to the input "input #1" of the MPC decoder 80. This set of bits 47 is partitioned by an upper-most demultiplexer 82 into m streams 95, 97, 99, 101 of sizes $N(C_1-C_2)$, $N(C_2-C_3), \ldots N(C_{m-1}-C_m), NC_m$, respectively, inversely to the corresponding multiplexer 34 of the MPC encoder 30 in FIG. 3. The first stream 95 contains $N(C_1-C_2)$ bits that correspond to the $\pi[1]$-th output of the (m, 1, •) MDS code. These bits 95 are sent to the decoder 84 of the (m, 1, •) MDS code. By definition of (m, 1, •) MDS code, any of its output symbols yields knowledge of the corresponding input as well as the other (m−1) outputs. Thus the upper-most I-MDS decoder 84 restores the subset of $N(C_1-C_2)$ input bits 117 (i.e. the decoded output symbols 117) of the (m, 1, •) MDS code as well as the remaining (m−1) output streams 83 (i.e. the decoding information 83) of size $N(C_1-C_2)$. While the subset of input bits 117 is collected by the user bit buffer/multiplexer 86, the (m−1) streams 83 of $N(C_1-C_2)$ output bits are passed over to the following decoding stages through the output labeled as "link #1". Note that the number of bits passed to the following stages matches the decoding flow diagram in FIG. 2. Next, the $\pi[2]$-th transmitted stream 59 is processed. This stream 59 also carries $NC_1$ bits of which $N(C_1-C_2)$ bits 83 are provided by the previous stage of decoding. Note that the remaining number of bits carried by the $\pi[2]$-th stream equals $(NC_1-N(C_1-C_2))=NC_2$. This number matches the throughput $C_2$ of the second subchannel as indicated in FIG. 1 so that an optimal decoder 52 in FIG. 4 restores all $NC_1$ bits 47 of the second data stream 59. These bits 47 are fed to the MPC decoder 80 via "input 2" wherein they are partitioned/demultiplexed by the second demultiplexer 82 into m streams of channel decoded symbols, the streams having sizes $N(C_1-C_2), N(C_2-C_3), \ldots N(C_{m-1}-C_m), N\, C_m$. Note that the stream containing $N(C_1-C_2)$ bits coincides with the set of bits carried over from the previous decoding stage; this set is of no use. The stream 103 that contains $N(C_2-C_3)$ bits is sent to the I-MDS decoder 84 of the (m,2,•) MDS code, along with a set 97 of $N(C_2-C_3)$ bits provided by the demultiplexer 82 of the first decoding stage. These two streams 97,103 provide a pair of outputs for each of $N(C_2-C_3)$ input blocks of the (m,2,•) MDS code. By definition of (m, 2, •) MDS code, any pair of its outputs yields knowledge of the corresponding two inputs as well as the other (m−1) outputs. Thus the corresponding I-MDS decoder 84 restores the subset 119 of $N2(C_2-C_3)$ input bits as well as the remaining (m−1) output streams 87 of size $N(C_2-C_3)$. The subset 119 of $N2(C_2-C_3)$ input bits is collected in the multiplexer 86. One of the remaining (m−1) output streams is shared with the $\pi[1]$-th stream that was recovered at the previous stage. This stream has no flier use. The other (m−2) output streams 87 are passed to the following decoding stages via the output "link #2". Once again, the number of bits passed to the following stages matches the decoding flow diagram in FIG. 2. The remaining decoding stages proceed in a similar way.

At the m-th decoding stage, the $\pi[m]$-th transmitted stream 73 is processed. This stream carries $NC_1$ bits. The subsets 83, 87, 91 of $N(C_1-C_2), N(C_2-C_3), \ldots N(C_{m-1}-C_m)$ bits from this stream are provided by the decoding stages 1 through (m−1) via the outputs "link 1" through "link m", respectively. The remaining number of unknown bits is therefore $$NC_1-N(C_1-C_2)-\ldots-N(C_{m-1}-C_m)=NC_m$$

This number matches the throughput $C_m$ of the m-th subchannel as indicated in FIG. 1. Hence an optimal decoder 76 in FIG. 4 restores this stream. The resulting $NC_1$ bits are sent to the MPC decoder 80 via "input m". The following demultiplexer 82 selects $NC_m$ bits 109 that are restored at this stage (since the other $N(C_1-C_m)$ bits out of $NC_1$ are provided by the previous decoding stages). Note that these bits are part of the m-th subset of $NmC_m$ user bits in the MPC encoder 30 (see FIG. 3). The remaining (m−1) blocks of $NC_m$ user constituting the m-th subset of $NmC_m$ bits in the MPC encoder are coming from the previous decoding stages as they contribute to the previously decoded transmitted streams. These m blocks are grouped to the decoded subset of $NmC_m$ user bits and fed to the multiplexer 86. Check that the total number user bits collected by the multiplexer 86 after the m-th decoding stage equals $$N(C_1-C_2)+N2(C_2-C_3)+\ldots+NmC_m=N(C_1+C_2+\ldots C_m)$$

i.e. the total number of the transmitted user bits. The decoding is now complete.

First, a transmission system 10 having MIMO fading channels with additive Gaussian noise will be discussed. In this context it is assumed that the signal at the output of each subchannel is given by a linear combination of the symbols transmitted in all subchannels and an additive Gaussian noise. In such scenarios, with an appropriate processing at the receiver 16, each subchannel may be regarded as a scalar channel corrupted by a residual inter-subchannel interference and additive Gaussian noise. The commonly used coding strategy consists of a bit-space encoding (FEC encoder), mapping the coded bits into channel symbols and putting these symbols into channel (modulation). The last step depends on the channel properties. Usually, modulation is accomplished in time domain (single carrier systems) or frequency domain (multicarrier systems). In both cases, spreading may be applied so that several channel symbols share several channel uses in time or frequency domain (giving rise to direct sequence or multicarrier spread spectrum transmission, respectively). The choice of channel symbol alphabet (signaling) depends on the desired spectral efficiency and FEC rate. The commonly used signaling schemes are: BPSK, QPSK, 8-PSK and $2^k$-QAM with $k \geq 2$. Note that the proposed encoding strategy may be applied for such MIMO fading channels. To this end, one has to specify the set of capacities $C_1 \ldots C_m$ that are characterized by the signal to interference plus noise ratios (SINR) within the respective subchannels. In the case of fading channels, the SNR may be unknown to the transmitter. The standard approach is to use outage values of SINR that are chosen, according to the expected statistical properties of the fading, as a lower bound on the actual unknown SINR for all but a small subset of outage channels. Note that the outage value of SINR/capacity/etc. is the value of SINR/capacity/etc. for which the outage rate is equal to a certain percentage of the cases/time when the actual SINR/capacity/etc. of the system is worse than the outage value.

The FEC coding strategies commonly used for channels with Gaussian noise are the standard convolutional codes and, since recently, parallel and serial concatenated interleaved (turbo) codes and low density parity check (LDPC) codes. Although all these codes may be incorporated within the encoders 24 in FIG. 3, the efficiency of our approach may depend on the properties of the chosen FEC code. Indeed, the error correction capability of the known user bits at the input of the FEC encoders 24 depends on the span of typical error patterns that involve the known bits. In the case of random-like codes, such as LDPC and turbo codes, typical error patterns span a substantial part of the coded bits. Therefore, every known bit at the input of the encoders 24 is expected to have a global error correction effect over the whole code (unlike a local effect in the case of convolutional codes). It is, therefore, expected that the use of turbo codes, LDPC or similar codes FEC codes will be particularly beneficial for the general MIMO encoding scheme disclosed here. For such FEC codes, the contributions of different MDS codes should be homogeneously mixed. Such a mixing may be achieved by an interleaver (not shown) coupled between the multiplexer 34 and the channel encoder 24 and which interleaver performs a pseudo-random (uniform) interleaving of each output 31 of the MPC encoder 30 prior to the FEC encoding (e.g. by turbo or LDPC codes), see FIG. 3. An interleaver may be further optimized subject to a chosen FEC code.

The general decoding scheme has been described above and is depicted by FIG. 4. At the n-th decoding stage, a FEC decoder 46,52,76,128 is activated which makes use of a partial knowledge of the inputs of the corresponding encoder 32. This knowledge is provided by the previous (n−1) decoding stages. A practical implementation of each decoder depends on the type of code and the corresponding decoding procedure. Here we distinguish between soft and hard decision decoders. In hard decision decoding, a FEC decoder generates binary decisions on the input user bits. These decisions on previously decoded bits (information elements) are used at the subsequent decoding stages to limit the choice of possible codewords.

Example. For convolutional codes, binary decisions on the input bits usually result from a ML sequence detection by Viterbi algorithm. The decisions on the previously decoded bits are then incorporated in the Viterbi algorithm of the successive decoding stages so that, at every trellis section associated to the previously decoded bit, only those state transitions are considered that correspond to the decoded binary value (thereby reducing the total number of possible transitions by 2 if the conventional Viterbi algorithm is applied).

In soft decision decoding, a FEC decoder generates (soft) real-valued metrics that represent reliability measures of the input bits. Usually, each soft metric is (an approximate) log-likelihood ratio, i.e. the logarithm of the ratio of a posteriori probability of an input bit being 0 versus a posteriori probability of this bit being 1, given the observed signal. Soft metrics are often involved in decoding procedures of concatenated codes and iterative decoding algorithms. The final decision on the input bit is taken according to the sign of such soft metrics. Whenever soft decisions on the input bits are available, the use of soft metrics on the bits provided by the previous decoding stages, instead of binary decisions (or equivalently, very big soft values) ensures generally a better performance.

Example: Soft decision decoding is commonly used to iteratively decode turbo codes and LDPC codes. In the case of turbo codes, soft metrics of the input bits are generated by the so-called soft-input soft-output (SISO) decoders of the component codes. For LDPC codes, the soft metrics result from the so-called belief propagation algorithm. Whenever such FEC codes are used within the MIMO encoding scheme disclosed here, soft metrics of the appropriate bits, obtained at the last iteration of the current stage, are transferred to the subsequent decoding stages. At the subsequent stages, the so-obtained soft metrics should be used as a priori metrics on the appropriate bits or added to the existing a priori metrics if the latter are available at these decoding stages.

Iterative decoding may be applied to improve the performance of the proposed MIMO scheme. Iterative decoding of the scheme in FIG. 1 means repeating the whole or any part of the full decoding cycle which consists of successive decoding of m subchannels as described above. In this case, the early decoding stages can make use of hard/soft information on the shared bits obtained at the subsequent stages during the previous iterations. In the case of soft decision decoding, the reliability values to be used at other stages should be computed according to the standard rules for extrinsic information, similarly to turbo decoding, in order to avoid double counting of the same information.

It remains to explain the operation of the MDS decoders 84. Here again, we will distinguish between hard and soft decision decoding. In the former case, the decoder is driven by binary decisions on a subset of output bits of the respective MDS code in order to find the corresponding input bits as well as the remaining output bits. A large variety of algebraic decoding methods may be used. Since the number of parallel channels is often small in the situations of interest, the associated decoding complexity is not important. One can use a simple syndrome decoding or even an exhaustive search over all possible codewords of an MDS code. In the case of soft decision decoding, the decoder receives real-valued metrics of a subset of output bits. These metrics reflect reliabilities of the respective bits, as explained above. Based on these metrics, the decoder computes the metrics of the corresponding input bits and the metrics of the remaining output bits. The computation rule is the same as in SISO decoding of turbo codes: the computed metrics of the stand for a posteriori reliabilities of the respective bits which are based on the a priori reliabilities a subset of output bits fed to the decoder. The relationship between the a priori and a posteriori reliabilities depends on the relationship between the corresponding bits. The latter relationship is defined by a generator matrix of the MDS code. The complexity of soft-decision decoding is relatively small when such is m.

The same channel coding principle may be applied to a binary MIMO transmission channel. A possible scenario is transmission of binary messages (data packets) in a network from a transmitter to a receiver via multiple routes (subchannels). Assume that exact reliabilities of different paths (crossover probabilities of the equivalent binary symmetric channels) are not known to the transmitter but the statistical properties (a distribution law of the crossover probability) are known, e.g. from modeling results. One way to deal with the uncertainty of reliabilities per subchannel is to decode these streams in such an order that the reliabilities of the ordered subchannels form a non-increasing sequence. As a matter of fact, variations of each element of an ordered sequence of independent identically distributed random values go to zero as the sequence length goes to infinity. Hence, one can accurately adapt transmission rates to the (quasi-deterministic) throughputs of the ordered subchannels provided that their number is big enough. Although the throughputs of the ordered subchannels may be assumed accurately known at the transmitter, the order of the extraction of the transmitted streams is unknown (unless a feedback channel between the transmitter and the receiver is used to convey channel information). In such a case, the overall MIMO channel falls under the scope of the general scheme in FIG. 1. Further implementation may be achieved based the available FEC schemes for binary symmetric channels (i.e. with Reed-Solomon codes and other BCH codes). Yet, it is desirable to adapt the existing coding schemes so as to emphasize the benefit of a partial knowledge of the input bits, according to the proposed channel coding strategy.

The channel coding strategy described above may be applied to increase the throughput of wireless communication systems that exploit multiple transmit and receive antennas. In such systems, multiple transmit antennas 28 are used to transmit streams of coded symbols that originate from the same data source. At the receiver side, these multiple streams are retrieved and decoded either simultaneously or successively. Simultaneous decoding of different streams yields a very high computational burden. This burden grows exponentially in the total number of bits per channel use transmitted by all antennas 28. Therefore, simultaneous decoding is feasible only for small data rates as compared to the theoretical throughput. Here, we focus on the successive decoding schemes where each data stream is recovered by removing the data streams that have been recovered at earlier stages and by canceling the remaining data streams, due to multiple receive antennas 40, via spatial (space-time or space-frequency) interference cancellation. Specifically, we consider schemes with ordered successive interference cancellation (OSIC).

A baseline system that makes use of the OSIC principle is disclosed in European Patent Application EP 0 951 091 A2. According to this known system, the total number of user bits 21 is partitioned into m symmetric streams 23. Each stream 23 undergoes an identical encoding (by encoders 24), modulation (by modulators 26) and is transmitted by one of m transmit antennas 28. A block diagram of such a transmitter 12 is shown in FIG. 5. The receiver 16 exploits M antennas 40 that produce M signal outputs. The receiver 16 applies the OSIC principle which is schematically shown in FIG. 6. It is assumed that the transfer function of the MIMO channel is known or accurately estimated at the receiver 16 (e.g. due to the standard training procedure, based on the reference signals sent by the transmitter 12). This MIMO transfer function will be schematically described by an M×m matrix H whose entry $H_{q,p}$ stands for the transfer function between the p-th transmit antenna 28 and the q-th receive antenna 40. In frequency selective fading, the entries of H are functions representing either time domain or frequency domain characterization of the channel. In non-selective (flat) fading, the entries of H are complex valued.

The received encoded information subsignals are demodulated in demodulators 42. Based on the known H, the receiver 16 extracts the m streams (information subsignals) successively. At the first (leftmost) layer or stage (comprised of a MMSE canceller 44, a decoder 46, an encoder/modulator 48, multipliers 56 and subtractors 60), one of the streams 41 is extracted, by canceling the contributions from the other (m−1) streams 41. Without loss of generality, assume that the index of the stream extracted at the first layer is $\pi[1]$. In the known system, a perfect cancellation of these streams is achieved due to projecting the vector $H_{\pi[1]} = [H_{1,\pi[1]}, \ldots, H_{M,\pi[1]}]^T$ (the superscript (T) stands for a matrix transpose) of channel transfer functions associated to this stream onto the part of the M-dimensional signal space which is orthogonal to the columns of the M×(m−1) matrix $[H_{1:M,\pi[2]}, \ldots, H_{1:M,\pi[m]}]$ representing the transfer functions of the other streams. The $\pi[1]$-th stream is a result of linear combining of signals from M antennas 40 with weights that are defined by the entries of the projected vector. This type of interference cancellation, known as zero forcing, remains sub-optimal in the presence of noise. A better performance may be achieved with minimum mean square error (MMSE) cancellation (in MMSE canceller 44). This approach maximizes the output SINR. To apply MMSE extraction to the $\pi[1]$-th stream, we compute m×M vector $$W_{\pi[1]}^{(1)} = (H_{\pi[1]}^* (\sigma_s^2 HH^* + \sigma_n^2 I_M)^{-1} H_{\pi[1]})^{-1} H_{\pi[1]}^* (\sigma_s^2 HH^* + \sigma_n^2 I_M)^{-1}. \quad (7)$$

Here the superscript (*) stands for a matrix conjugate transpose, $I_M$ is the M×M identity matrix, $\sigma_s^2$ is the (average) power of every transmitted signal and $\sigma_n^2$ is the ambient noise power. The $\pi[1]$-th stream is a result of linear combining of signals from M antennas 40 with weights that are defined by the respective entries of $W_{\pi[1]}^{(1)}$. Whenever the ambient noise at different antennas is uncorrelated, MMSE cancellation results in the highest possible SINR:

$$SINR_{\pi[1]}^{(1)} = [(H_{\pi[1]}^* (\sigma_s^2 HH^* + \sigma_n^2 I_M)^{-1} H_{\pi[1]})^{-1} - 1]^{-1}. \quad (8)$$

The extracted $\pi[1]$-th stream 45 is forwarded by the MMSE canceller 44 to the decoder 46 which recovers the corresponding stream of user bits 47. These user bits 47 are encoded and modulated again by an encoder/modulator 48 to the sequence of channel symbols 49. The sequence of symbols 49 is scaled by the respective entries of the transfer function $H_{\pi[1]}$ (by means of the multipliers 56) to produce the contributions of the $\pi[1]$-th stream to all M receiver branches. These contributions are extracted from the corresponding received signals by means of subtractors 60 as indicated in FIG. 6. The resulting M signals 55 are free from the contributions of the $\pi[1]$-th stream 45. The described procedure is applied recursively so that at the n-th layer/stage, a $\pi[n]$-th stream is extracted with certain $SINR_{\pi[n]}^{(n)}$, after the MMSE cancellation of the remaining (n−1) interfering streams by means of filter $W_{\pi[n]}^{(n)}$, its contribution is reconstructed and removed from the received signals, $1 \leq n \leq m$ (except for the last layer/stage where the removal is not necessary). In FIG. 6 also the second layer/stage and the m-th layer/stage are shown. This second stage is comprised of MMSE canceller 50, decoder 52, encoder/modulator 54, multipliers 64 and subtractors 68. The m-th stage is only comprised of MMSE canceller 74 (which comprises a Maximum Ratio Combiner (MRC) filter since no interference is present at this stage) and decoder 76. The receiver 16 further comprises a multiplexer 72 which multiplexes the decoded information subsignals 47 of the m layers/stages into an information signal 77 comprising user bits.

The throughput of this MIMO transmission system depends on the set of SINR values $SINR_{\pi[1]}^{(1)}, \ldots, SINR_{\pi[m]}^{(m)}$. Hence, the order $\pi = \{\pi[n], 1 \leq n \leq m\}$ of the processing of m streams may be critical. To highlight the impact of the processing order on the system throughput, note that the symmetry of different subchannels and the absence of channel knowledge at the transmitter yield equal transmission rates (throughputs) to be used for all subchannels. The overall throughput of such a system equals to m times the throughput of one subchannel. Finally, the throughput per subchannel is limited by the minimum of their respective throughputs which is defined by $\min\{SINR_{\pi[1]}^{(1)}, \ldots, SINR_{\pi[m]}^{(m)}\}$ The maximum throughput, therefore, corresponds to the maximum of $\min\{SINR_{\pi[1]}^{(1)}, \ldots, SINR_{\pi[m]}^{(m)}\}$ whereas the optimal processing order is defined by such $\pi$ that maximizes $\min\{SINR_{\pi[1]}^{(1)}, \ldots, SINR_{\pi[m]}^{(m)}\}$. As shown in the above mentioned European Patent Application, the optimal processing order $\pi$ is achieved when, at every stage, the subchannel is selected which maximizes the local SINR:

$$\pi[n] = \arg\max_k \{SINR_k^{(n)}: 1 \leq k \leq m, k \neq \pi[p]: 1 \leq p < n\}$$
$$1 \leq n \leq m. \quad (9)$$

Figure 10:
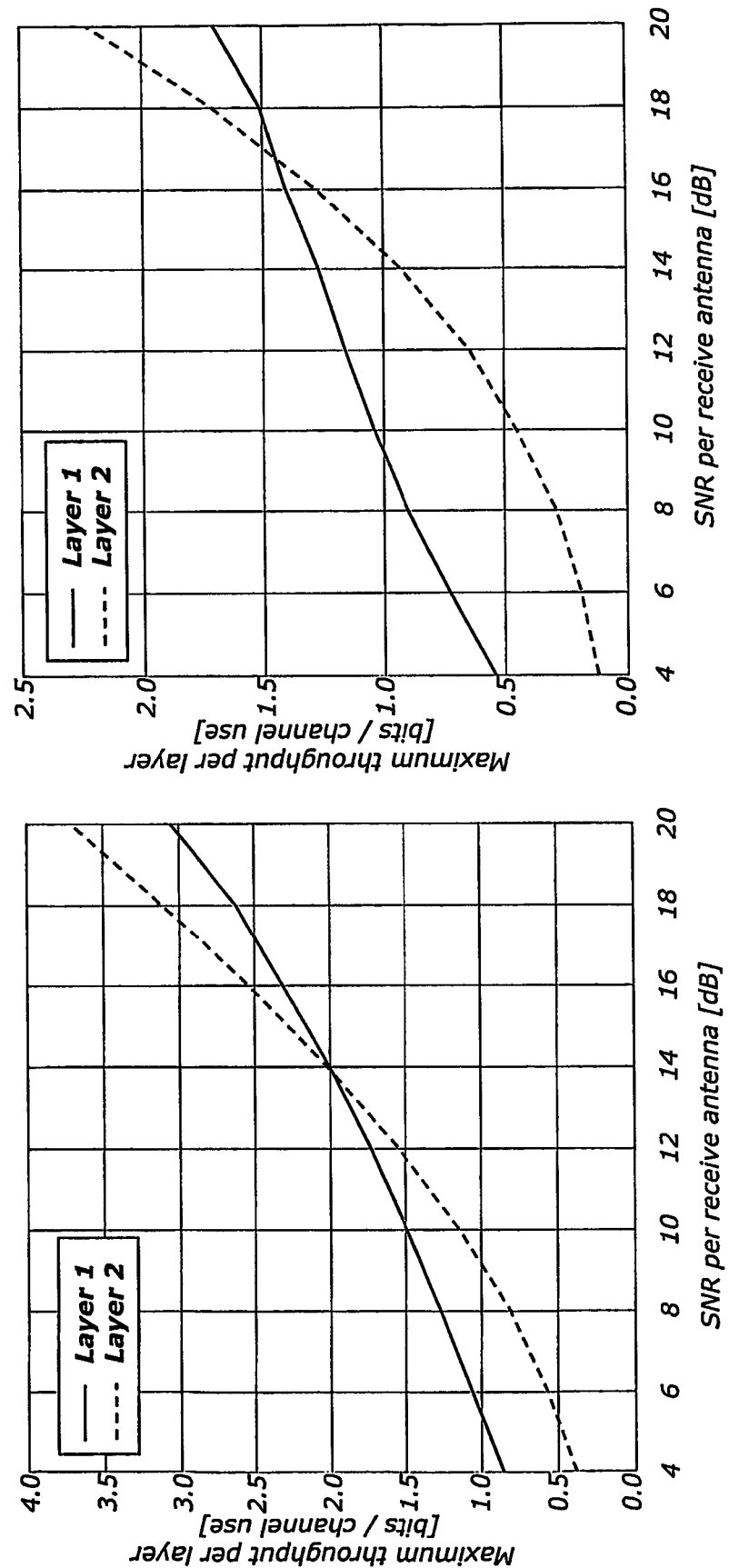

A MIMO transmitter system as described earlier in this section, with the transmitter and receiver as in FIG. 5 and FIG. 6 respectively, MMSE cancellation filters specified by (7), decision statistics defined by (8) and processing order defined in (9), is regarded as the baseline system. Let us analyze a theoretically achievable throughput of such a system. We will assume a narrow-band (non-selective) Rayleigh fading channel with fully uncorrelated transmit/receive antennas. This means that the entries of the channel matrix are statistically independent complex Gaussian variables with zero mean and variance (1/2) per complex dimension. Let us first consider a system with two transmit/receive antennas: M=m=2. For this setup, the outage ratios $SINR_{\pi[1]}^{(1)}$ and $SINR_{\pi[2]}^{(2)}$ for both layers have been estimated from 100000 independent Monte-Carlo trials for a wide range of the overall SNR per receive antenna (i.e. ratio of the average total signal power from all transmit antennas to the noise power at any receive antenna). The empirical SINR values for the outage rates of 10% and 1% are plotted in FIG. 9 (showing outage SINR per layer/stage versus the overall SNR per receive antenna for outage rates 10% (left frame) and 1% (right frame), 2 transmit antennas, 2 receive antennas). The corresponding outage values of capacities (maximum throughputs), computed according to the standard relationship $$C = \log_2(1 + SINR)[\text{bits/channel use}] \quad (10)$$

are plotted in FIG. 10 (showing outage throughput per layer/stage versus the overall SNR per receive antenna for outage rates 10% (left frame) and 1% (right frame), 2 transmit antennas, 2 receive antennas). One can see that at small and moderate SNR, the first (upper) layer has a bigger throughput. The advantage of the first layer over the second (lower) one also depends on the designed outage rate. Note that the maximum throughput of the first layer is nearly two times as big as the throughput of the second layer in some cases of practical interest. Namely, the region of SNR around 6-8 dB, outage rate 10% and less may be relevant for cellular communications in interference-limited environments, e.g. CDMA.

Figure 11:
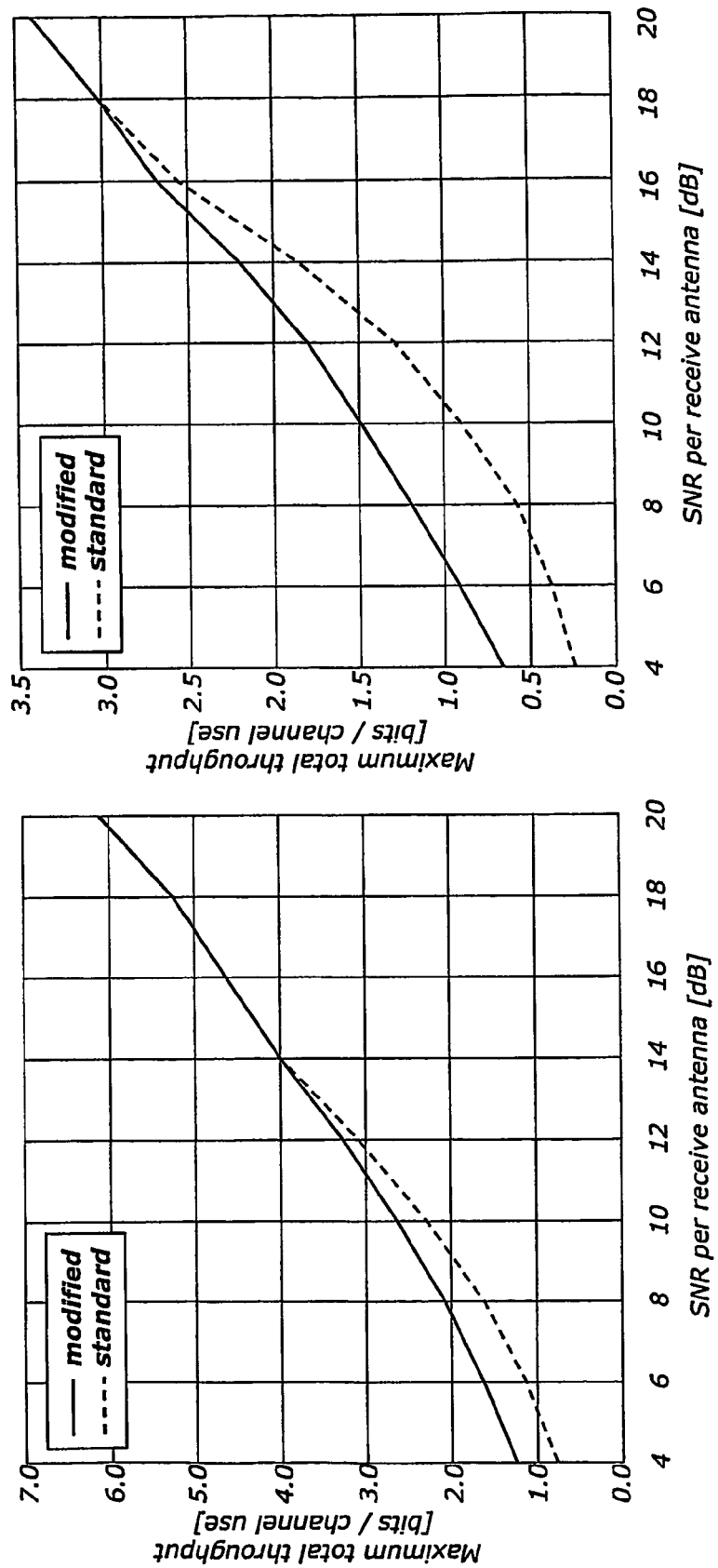

As explained earlier, the throughput of each subchannel within the baseline system may not exceed the minimum of throughputs observed at different layers. Therefore, the maximum total throughput of the baseline system is twice the minimum of these throughputs. The dashed line in FIG. 11 shows the overall throughput of the baseline (standard) system versus the overall SNR for the outage rates of 10% (left frame) and 1% (right frame) respectively.

At this point, we note that the overall throughput may be increased up to the sum of the throughputs $C_1$ and $C_2$ of the two layers in the region of SNR and outage rates where $C_1 \geqq C_2$. Indeed, one may notice that the transmission system with a transmitter 12 as in FIG. 5 and a receiver 16 as in FIG. 6 is a particular case of the general transmission scheme in FIG. 1 where the capacities $C_1 \ldots C_m$ stand for the outage throughputs achievable at layers 1 through m respectively while the permutation $\pi$ defines the processing order of the transmitted streams. The set of outage throughputs $C_1 \ldots C_m$ is defined by the statistical description of the assumed propagation environment (in our example, uncorrelated Rayleigh fading). Usually, these throughputs are measured off-line and may be assumed known to the transmitter 12 and to the receiver 16. The permutation $\pi$ depends on the channel realization. This permutation is defined at the receiver 16, subject to the estimated channel matrix, and therefore is unknown to the transmitter 12. Hence, the baseline transmission system falls under the general scheme as depicted by FIG. 1 and therefore the general channel coding principle described above applies in this case. Let us design the encoder that has to operate in presence of uncorrelated Rayleigh fading at SNR of 8 dB and 10% outage rate. In this case, the throughputs achievable at layers 1 and 2 are $C_1 \approx 1.27$ and $C_2 \approx 0.81$ user bits per channel use respectively, see FIG. 10. The practically achievable throughputs of this layers are, therefore, upper-bounded by $C_1$ and $C_2$. These upper bounds are never achieved in practice since a (small) fraction of the spectral efficiency has to be sacrificed in order to satisfy the QoS requirements in terms of error rates. This fraction depends on the desired features of a FEC and QoS requirements. The definition of practical throughput relates to the FEC design which is not addressed specifically in this document. Therefore, we will assume in this example an ideal FEC so that the maximum throughputs are achievable. Suppose that a block of data to be transmitted makes use of N=100 channel uses. This may correspond to e.g. a block of 100 symbols of certain alphabet serially sent over the channel. According to the block-diagram of the SAC encoder (FIG. 3), we have to partition the set of $N(C_1+C_2)=127+81=208$ user bits into two subsets of sizes $N(C_1-C_2)=127-81=46$ and $N2C_2=2\cdot 81=162$. The first subset is encoded with (2, 1, •) MDS code. The generator matrix of a binary MDS code (2, 1, 1) is given in (6). According to the generating matrix, this MDS code is a rate (1/2) repetition code. Hence 46 user bits of the first subset are simply duplicated and the resulting copies are fed to the output streams via the multiplexers 34 in FIG. 3. The second subset of 162 bits is partitioned into two blocks of 81 bits. These blocks contribute to the two output streams through the same multiplexers 34. Each output stream contains 127 bits. These streams are encoded by channel encoders 24, modulated by modulators 26 and transmitted via different antennas 28 as shown in FIG. 7. Here, the means for transmitting the encoded information subsignals 25 are formed by the modulators 26 and the antennas 28. At the receiver 16, the standard OSIC extraction of the data streams is performed, as described above. According to the processing order $\pi$ determined at the receiver 16 via (9), the stream $\pi[1]$ is extracted at the first (upper) layer. Since the outage throughput of this layer is $C_1$, the corresponding $NC_1 \approx 127$ user bits are successfully decoded in the decoder 46. According to the block diagram in FIG. 8, the values 47 (by bit values, we understand either binary/hard decisions or real-valued/soft decisions) of these bits are fed to the "input 1" of the MPC decoder 80. Inside the MPC decoder 80 (see FIG. 4), these values 47 are partitioned into a set of 46 bit values corresponding to the $\pi[1]$-th output of the (2,1,1) MDS code and the remaining 81 bit values. Check that decoding of the (2, 1, 1) MDS code consists of replicating 46 bit values of the $\pi[1]$-th output to both outputs of the decoder. While the first replica 117 is collected by the multiplexer 86, the second replica 83 is sent to the output "link 1" of the MPC decoder 80. At the second layer, the stream $\pi[2]$ is extracted. The FEC decoder 52 of this stream 59 benefits from the knowledge of 46 bits values out of the total 127 bits fed via "link 1" of the MPC decoder 80, see FIG. 8. The remaining $NC_2=81$ user bits may be successfully recovered since the throughput of the second layer is $C_2 \approx 0.81$. The whole stream 47 of 127 bit values of the second stream is sent to the "input 2" of the MPC decoder 80. According to FIG. 4, a subset of 81 bit values at this stage is merged with the subset of 81 bit values from the previous decoding stage and sent to the multiplexer 86. The total number 46+81+81=208 of bit values collected in the multiplexer 86 equals to the total number of the transmitted user bits. In the case of soft-decision decoding, the soft bit values are converted into hard decisions on the user bits.

Note that the proposed channel coding scheme results in the overall throughput of $(C_1+C_2) \approx 2.08$ bits per channel use. This yields a 28% improvement as compared to the baseline system with the overall throughput of $2C_2 \approx 1.62$ bits per channel use. The throughputs of baseline system and the proposed modification of this latter are plotted in FIG. 11 for various SNR and outage rates of 10% and 1%. The improvement of the modified transmission system over the baseline systems varies from 10% to 100% and even higher, at low and moderate SNR.

In the general case of M and m, the transmitter 12 of the modified baseline system is shown in FIG. 7. This transmitter 12 makes use of MPC encoder 30 shown in FIG. 3. The receiver 16 of the modified baseline system is presented in FIG. 8. The modified receiver 16 differs from the receiver 16 of the baseline system (shown in FIG. 6) by the MPC decoder 80 and related links with FEC decoders 46,52,76,128 of different layers. It is worthwhile to mention that the FEC structure should be adapted to take advantage of the knowledge of known bits. Although the design of specific FEC codes is beyond the scope of this invention, some promising options for the choice of FEC have been indicated above.

Figure 12:
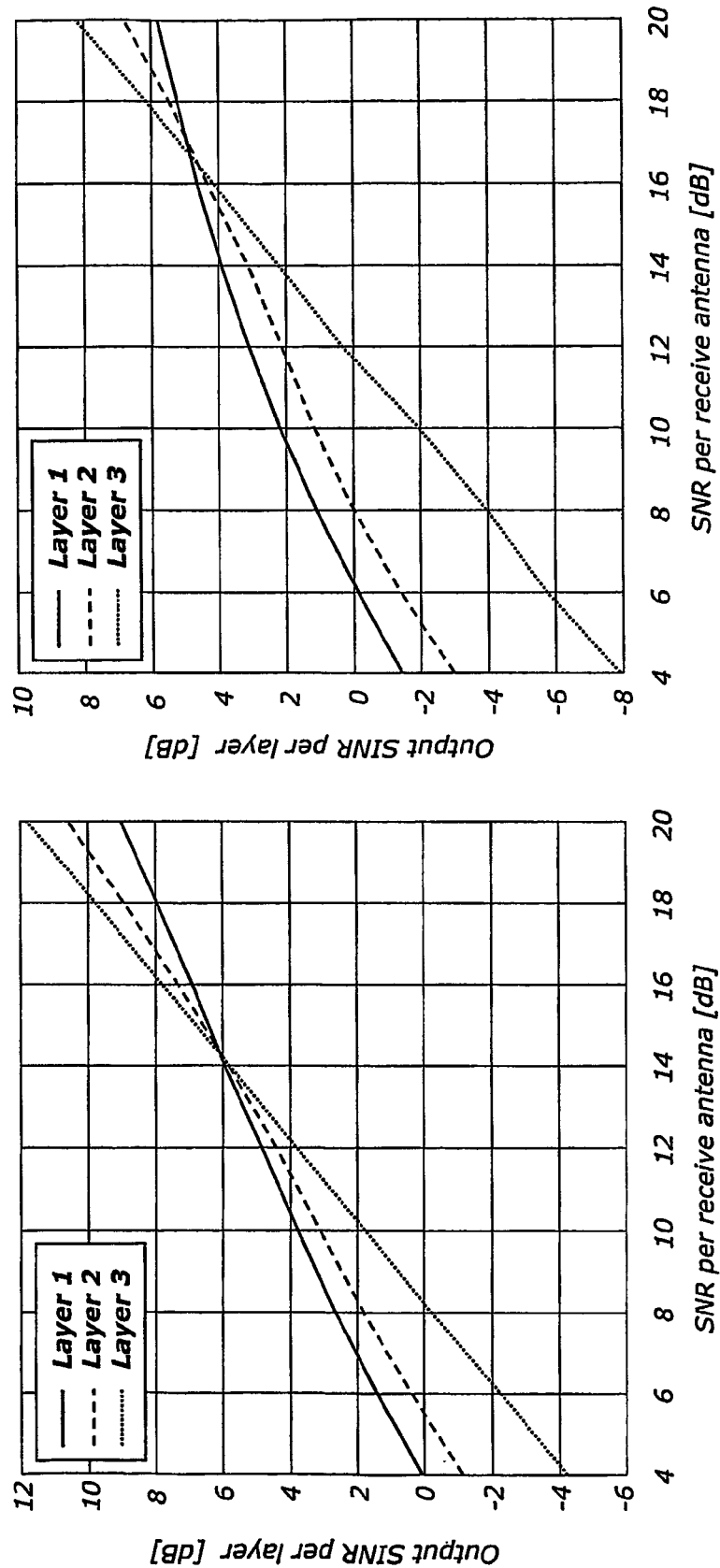

In the remainder, we give a slightly more complex example of MPC coding, for a MIMO transmission system with M=m=3. Under the assumption of uncorrelated Rayleigh fading, we have computed the outage SINR achievable at different layers, the corresponding outage throughputs per layer and the outage overall throughputs of the baseline (standard) and modified systems, for a wide range of SNR and outage rates 10% and 1%, see FIGS. 12-14. As earlier, we select SNR of 8 dB, 10% outage rate and N=100 channel uses per block. FIG. 12 shows outage SINR per layer/stage versus the overall SNR per receive antenna for outage rates 10% (left frame) and 1% (right frame), 3 transmit antennas, 3 receive antennas.

Figure 13:
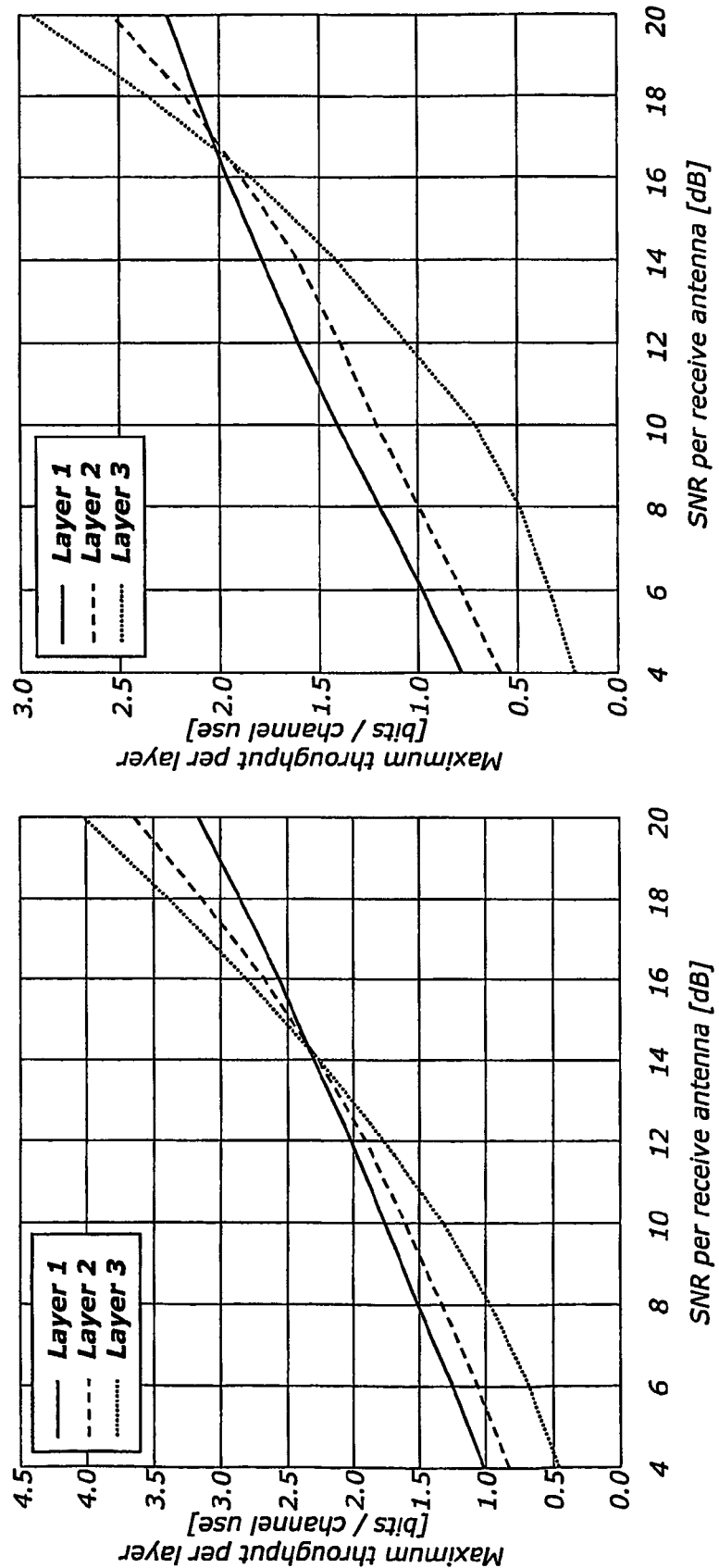
Figure 14:
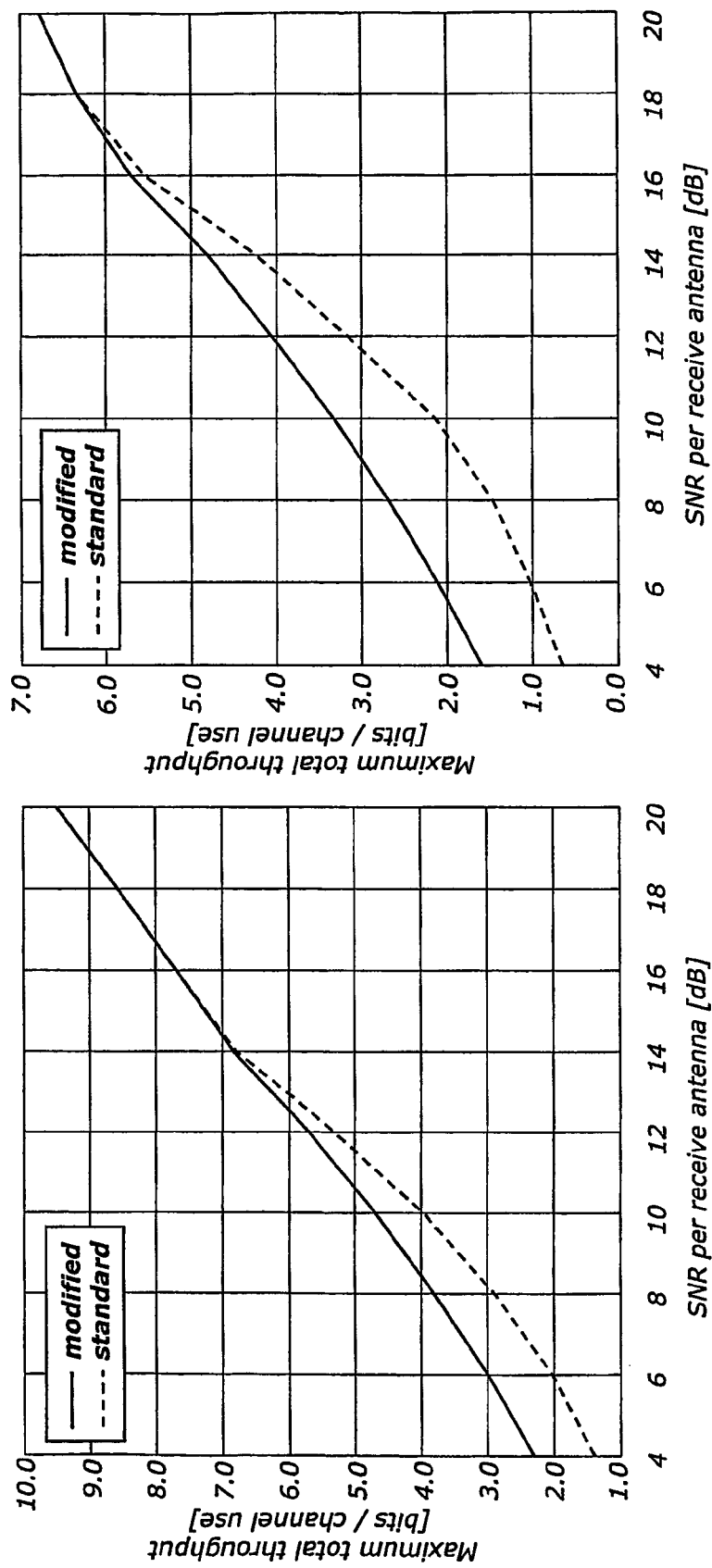

FIG. 13 shows outage throughput per layer/stage versus the overall SNR per receive antenna for outage rates 10% (left frame) and 1% (right frame), 3 transmit antennas, 3 receive antennas. FIG. 14 shows total outage throughput of the standard and the modified system versus the overall SNR per receive antenna for outage rates 10% (left frame) and 1% (right frame), 3 transmit antennas, 3 receive antennas.

First of all, we need to find the set of maximum throughputs $\underline{C}_1$, $\underline{C}_2$, $\underline{C}_3$ that deliver the maximum overall throughput $C_\Sigma$ under the constraint (4). According to FIG. 13, we have $\underline{C}_1 \approx 1.51$, $\underline{C}_2 \approx 1.33$, $\underline{C}_3 \approx 0.95$. Note that (4) is satisfied with $\underline{C}_1 = C_1$, $\underline{C}_2 = C_2$ and $\underline{C}_3 = C_3$. The transmitter 12 operates according to FIG. 5 with MPC encoder 30 described in FIG. 3. The total number of user bits is $N(C_1+C_2+C_3)=151+133+95=379$. These 379 user bits are partitioned into m=3 subsets with sizes $N(C_1-C_2)=18$, $N2(C_2-C_3)=2\cdot 38=76$ and $N3C_3=3\cdot 95=285$. The respective sizes of the output blocks are $N(C_1-C_2)=18$, $N(C_2-C_3)=38$ and $NC_3=95$, as described in FIG. 3. Finally, the MDS codes used in the MPC encoder 30 are given by (3, 1, 1) and (3, 2, 1) codes with the respective generating matrices specified in (6).

The receiver 16 operates as described in FIG. 8. The difference from the receiver 16 of the baseline system in FIG. 6 is in the MPC decoder block 80 and its links to various decoding stages. This MPC decoder 80 operates similarly to the MPC decoder 80 in the previous example. It remains to specify the decoding of MDS codes. First, we note that the (3, 1, 1) MDS code defined in (6) is rate (1/3) repetition code. Hence the decoding procedure consists of copying the input of the decoder to its outputs. Let us consider the decoding procedure for the (3, 2, 1) code. First, we address hard decision decoding. As mentioned above, an exhaustive search can be used. In order to describe the search algorithm, we denote by $b_1$, $b_2$ a pair of inputs and by $c_1$, $c_2$, $c_3$ the respective outputs of the (3, 2, 1) MDS code. According to the description of FIG. 4, the task of the decoder is to find input bits $b_1$, $b_2$ and an output bit $c_{\pi[3]}$ given a pair of outputs $c_{\pi[1]}$, $c_{\pi[2]}$. For the (3, 2, 1) MDS code defined in (6), the search is performed according to the lookup table shown in FIG. 15 and FIG. 16.

Finally, we consider soft decision decoding. Let us define $I_1$, $I_2$ a pair of real-valued metrics associated with the pair of input bits $b_1$, $b_2$ and $O_1$, $O_2$, $O_3$ three output metrics associated with the output bits $c_1$, $c_2$, $c_3$. The task of the decoder is to compute input metrics $I_1$, $I_2$ and an output metric $O_{\pi[3]}$ given a pair of output metrics $O_{\pi[1]}$, $O_{\pi[2]}$. Conventionally, bit metrics are defined as log-likelihood ratios (LLR). The LLR values are usually computed via the maximum a posteriori probability (MAP) algorithm, or its simplified version widely known as Max-Log-MAP. The respective computation rules applicable to the (3, 2, 1) MDS code in (6) are specified in FIG. 17 and FIG. 18 respectively.

It is worth noting that the exact expressions to compute LLR depend on the code structure and should be derived from the general rules of MAP or Max-Log-MAP computations for each particular code.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A transmission system for transmitting an information signal via a plurality of subchannels from a transmitter to a receiver, the transmitter comprising:

a demultiplexer for demultiplexing the information signal into a plurality of information subsignals in dependence on a throughput of the subchannels as ordered by the receiver;

an encoder for encoding input symbols of the information subsignals into output symbols such that k input symbols of the k-th information subsignal are encoded with a k×m-code into m output symbols, $1 \leq k \leq m$, said code having the following properties:

all k input symbols and all m−k other output symbols are determinable from any k output symbols, and no m−l other output symbols are determinable from any l output symbols, l<k;

a multiplexer for multiplexing the output symbols into output information subsignals;

an interleaver for interleaving the output information subsignals;

a channel encoder for channel encoding the interleaved output information subsignals into encoded information subsignals;

and means for transmitting each encoded information subsignal via one of the subchannels to the receiver;

the receiver comprising:

means for receiving the encoded information subsignals;

a channel decoder for successively channel decoding the received encoded information subsignals into channel decoded information subsignals by incorporating decoding information of already channel decoded information subsignals;

a demultiplexer for demultiplexing the channel decoded information subsignals into channel decoded symbols;

a decoder for decoding the channel decoded symbols into decoded output symbols and for supplying the decoding information regarding the decoded output symbols to the channel decoder;

a further multiplexer for multiplexing the decoded output symbols into an output information signal.

2. The transmission system according to claim 1, wherein the code is a maximum distance separable (MDS) code.

3. The transmission system according to claim 1, wherein the channel decoder is arranged for decoding a received encoded information subsignal by incorporating decoding information of the most recently channel decoded information subsignal.

4. The transmission system according to claim 1, wherein the transmission system is a binary transmission system and wherein the information subsignals comprise differently routed binary signals.

5. The transmission system according to claim 1, wherein the transmission system is a wireless communication system, and wherein the transmitter comprises a plurality of transmit antennas, wherein each channel encoded information subsignal is transmitted via one of the transmit antennas to the receiver, and wherein the receiver comprises a plurality of receive antennas for receiving the encoded information subsignals.

6. A transmitter for transmitting an information signal via a plurality of subchannels to a receiver, the transmitter comprising:

a demultiplexer for demultiplexing the information signal into a plurality of information subsignals in dependence on a throughput of the subchannels as ordered by the receiver;

an encoder for encoding input symbols of the information subsignals into output symbols such that k input symbols of the k-th information subsignal are encoded with a k=m-code into m output symbols, $1 \leq k \leq m$, said code having the following properties:
- all k input symbols and all m−k other output symbols are determinable from any k output symbols, and
- no m−l other output symbols are determinable from any l output symbols, l<k;

a multiplexer for multiplexing the output symbols into output information subsignals;

an interleaver for interleaving the output information subsignals;

a channel encoder for channel encoding the interleaved output information subsignals into encoded information subsignals;

and means for transmitting each encoded information subsignal via one of the subchannels to the receiver.

7. The transmitter according to claim 6, wherein the code is a maximum distance separable (MDS) code.

8. The transmitter according to claim 6, wherein the transmitter comprises a plurality of transmit antennas, and wherein each channel encoded information subsignal is transmitted via one of the transmit antennas to the receiver.

9. A method of transmitting an information signal via a plurality of subchannels to a receiver, the method comprising:

demultiplexing, by a demultiplexer, the information signal into a plurality of information subsignals in dependence on a throughput of the subchannels as ordered by the receiver;

encoding input symbols of the information subsignals into output symbols such that k input symbols of the k-th information subsignal are encoded with a k=m-code into m output symbols, $1 \leq k \leq m$, said code having the following properties:
- all k input symbols and all m−k other output symbols are determinable from any k output symbols, and
- no m−l other output symbols are determinable from any l output symbols, l<k;

multiplexing the output symbols into output information subsignals;

interleaving the output information subsignals;

channel encoding the interleaved output information subsignals into encoded information subsignals; and transmitting each encoded information subsignal via one of the subchannels to the receiver.

10. The method of transmitting according to claim 9, wherein the code is a maximum distance separable (MDS) code.

* * * * *